US011151541B1

(12) United States Patent
Jackets et al.

(10) Patent No.: US 11,151,541 B1
(45) Date of Patent: Oct. 19, 2021

(54) PEER-TO-PEER PREPAID CARD MANAGEMENT SYSTEM

(71) Applicant: VOCALINK LIMITED, London (GB)

(72) Inventors: Steven Paul Jackets, London (GB); Nicola Guiso, London (GB); Alana Georgia Deighan, Luton (GB); Fiona Emily Benton Robinson, London (GB); Ivan Jordanov Katsarov, London (GB)

(73) Assignee: VOCALINK LIMITED, London (GB)

( * ) Notice: Subject to any disclaimer, the term of this patent is extended or adjusted under 35 U.S.C. 154(b) by 0 days.

(21) Appl. No.: 16/854,110

(22) Filed: Apr. 21, 2020

(51) Int. Cl.
*G06Q 20/00* (2012.01)
*G06Q 20/28* (2012.01)
*G06Q 20/34* (2012.01)
*G06Q 20/40* (2012.01)
*G06Q 20/22* (2012.01)

(52) U.S. Cl.
CPC ........... *G06Q 20/28* (2013.01); *G06Q 20/223* (2013.01); *G06Q 20/346* (2013.01); *G06Q 20/349* (2013.01); *G06Q 20/403* (2013.01); *G06Q 20/40145* (2013.01)

(58) Field of Classification Search
CPC .... G06Q 20/28; G06Q 20/223; G06Q 20/346; G06Q 20/349; G06Q 20/40145; G06Q 20/403
USPC ............................................ 23/380; 235/380
See application file for complete search history.

(56) References Cited

U.S. PATENT DOCUMENTS

| 8,905,295 | B2* | 12/2014 | Serhal | G06Q 20/3276 |
| | | | | 235/375 |
| 9,203,835 | B2* | 12/2015 | Jakobsson | H04W 12/069 |
| 10,803,463 | B1* | 10/2020 | Barnum | H04L 63/0853 |
| 10,805,501 | B2* | 10/2020 | Berman | G06K 9/00248 |
| 10,839,365 | B2* | 11/2020 | Taveau | G06Q 20/40145 |
| 2013/0117181 | A1* | 5/2013 | Isaacson | G06Q 30/0224 |
| | | | | 705/41 |
| 2013/0166441 | A1* | 6/2013 | Kobylkin | G06Q 20/354 |
| | | | | 705/39 |
| 2013/0173405 | A1 | 7/2013 | Gouessant | |
| 2013/0290115 | A1 | 10/2013 | Leoni et al. | |

FOREIGN PATENT DOCUMENTS

CN 104618117 B 6/2018

OTHER PUBLICATIONS

Extended European Search Report issued in European Application No. 21166797.7, dated Sep. 10, 2021, 9 pages.

* cited by examiner

*Primary Examiner* — Daniel A Hess
(74) *Attorney, Agent, or Firm* — Talem IP Law, LLP (57) ABSTRACT

A method for peer-to-peer prepaid card accounts can create a prepaid card that can receive donations through a QR code disposed on the physical card. Restrictions can also be placed on the card to control where or how the funds may be used. The method can, in response to receiving a request at a card management service to create an account, obtain account information, wherein the account information comprises a user name, an account number, a QR code image, and optionally a biometric data. The account information can be stored as a card account for the user, which is funded by receiving a payment from a second party using the QR code. Then, when a card holder uses the card for a transaction, the card management service can function as an issuer to authorize its use.

16 Claims, 7 Drawing Sheets

PEER-TO-PEER PREPAID CARD MANAGEMENT SYSTEM

BACKGROUND

In the modern day, a great many people and industries are moving towards cashless solutions for payment, typically in the form of card-based solutions. This can be disadvantageous for unbanked or underbanked people, as these people rely heavily on cash to participate in transactions.

For example, a child is unlikely to be able to make use of a bank account, but, if the parent of the child is moving away from cash, the child may lose out on their already limited financial independence. A prepaid card is an effective solution to this issue, but prepaid cards can be hard to manage, particularly with regards to funding if a bank is not involved.

Another example of underbanked people can be the homeless. The move towards cashless solution hurts them even more as not only do the homeless often rely on cash to pay for goods, but their ability to get money in the first place is often tied to cash donations, most of which are spontaneous. If a random passerby has no cash, donating to a homeless person can be tricky even if the passerby wants to help. Similar to the example of the child, a prepaid card can provide the homeless with a means to participate in transactions, but the nature of prepaid cards makes them ill-suited for spontaneous donations.

BRIEF SUMMARY

Peer-to-peer prepaid card management system and methods for transferring money are described. Through the described system and methods, donations (or other types of payments) to an entity that does not have a banking account can be in a form of a peer-to-peer transaction.

A physical card can be provided as a peer-to-peer prepaid card that can receive donations through a QR code disposed on the physical card. The QR code can be used to limit fraud or misuse. Restrictions can also be placed on the card to limit unwanted spending.

The peer-to-peer prepaid card can be managed by a peer-to-peer prepaid card management system, which can perform a method including receiving a request, at a card management service of the peer-to-peer prepaid card management system, to create an account; in response to receiving the request to create the account, obtain account information. The account information can include a user name, an account number, a QR code image, and optionally a biometric data. The peer-to-peer prepaid card management system can store the account information as a card account for the user. Once the card account for the user is established and a physical card with a QR code encoding the account number for the card account for the user is provided to the user, the peer-to-peer prepaid card management system can receive a payment from a second party to fund the card account for the user. The second party is able to transfer funds to the user through a link accessed by the QR code disposed on the physical card.

The peer-to-peer prepaid card management system can manage the user's funds in a similar fashion as an issuer in order for the physical card to be able to participate in a transaction. The transaction can be initiated by receiving a transaction request at the card management service of the peer-to-peer prepaid card management system. The transaction request can include transaction details, card details, and, optionally, fresh biometric data. The card management service can identify the card account from the card details in the transaction request, determine whether the transaction details satisfy account restrictions, determine whether the card account has sufficient funds to complete the transaction, and, in the implementation where there is biometric data stored as part of the account information of the user and when a fresh biometric data is received with the transaction request, verify the received biometric data against the biometric data stored as part of the account information for the user. When the transaction details satisfy the account restriction, the biometric data is verified (when used), and the card account has sufficient funds, the transaction can be authorized.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Peer-to-peer prepaid card management system and methods for transferring money are described. Through the described system and methods, donations (or other types of payments) to an entity that does not have a banking account can be in a form of a peer-to-peer transaction.

A peer-to-peer transaction is an electronic money transfer made from one person to another person through an intermediary that handles the banking information. Conventionally, an application or eCommerce site may enable one user to send money from their bank account or an in-application account to another user (and their bank account or in-application account) using the other user's email, phone number, or account handle. Such a money transfer is suitable when both entities have bank accounts. However, for the underbanked and unbanked people, the conventional peer-to-peer transactions and applications are generally not suitable or easy for them to use.

A physical card can be provided as a peer-to-peer prepaid card that can receive donations through a QR code disposed on the physical card. The QR code can be used to limit fraud or misuse. Restrictions can also be placed on the card to limit unwanted spending. A peer-to-peer prepaid card management system is provided that supports third party funding and replenishment of the peer-to-peer prepaid card.

Figure 1:
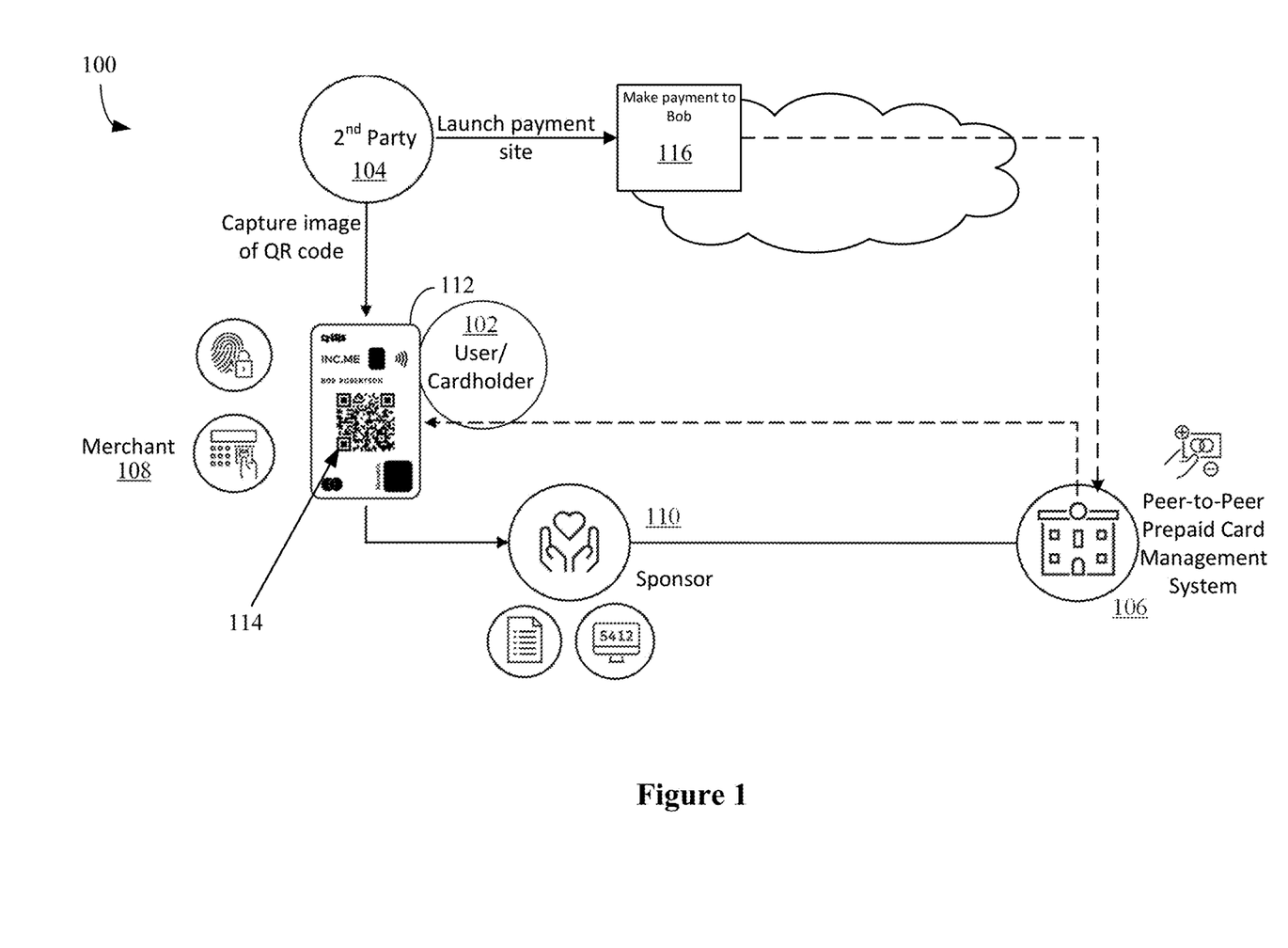
FIG. 1 illustrates an example environment for a peer-to-peer prepaid card management system.

FIG. 1 illustrates an example environment for a peer-to-peer prepaid card management system. An environment 100 can include a user 102, a second party 104, a card management service 106, a merchant 108, and a sponsor 110. The user 102 can be a person (e.g. a child or homeless person) or group that can access and receive funds using a payment card 112 associated with the card management service 106. The second party 104 can be a person or group interested in donating or otherwise funding the user 102. The second party 104 can donate to or fund the user 102 by making a payment to the card management service 106. The card management service 106 can be a system that manages one or more payment cards for one or more users. The card management service 106 can be associated with a financial institution (e.g., a bank) or a payment network operator (e.g. Mastercard Incorporated). The merchant 108 can be a business entity or person that receives payment from the user 102 via a transaction with payment card 112. The merchant 108 can use a point-of-sale device to process the payment card 112 and collect other necessary information for the transaction to be approved (e.g. biometric data). The sponsor 110 can be a person or group (e.g. a parent for a child or a homelessness support organization for a homeless person) that creates the accounts on behalf of the user 102. The sponsor 110 can be allowed by the card management service 106 to add and remove restrictions from certain accounts, including the ones that the sponsor created. The sponsor 110 may or may not have access to the funds on the account. The payment card 112 can be a physical card with a QR code 114 that, when captured via an application on a computing device of the second party 104, launches a payment site 116 from which the second party 104 can cause funds to be transferred to fund or replenish the user's account associated with the payment card 112. Thus, the QR code can be considered to encode a uniform resource location of a payment page for funding the card account of the user.

Figure 2A:
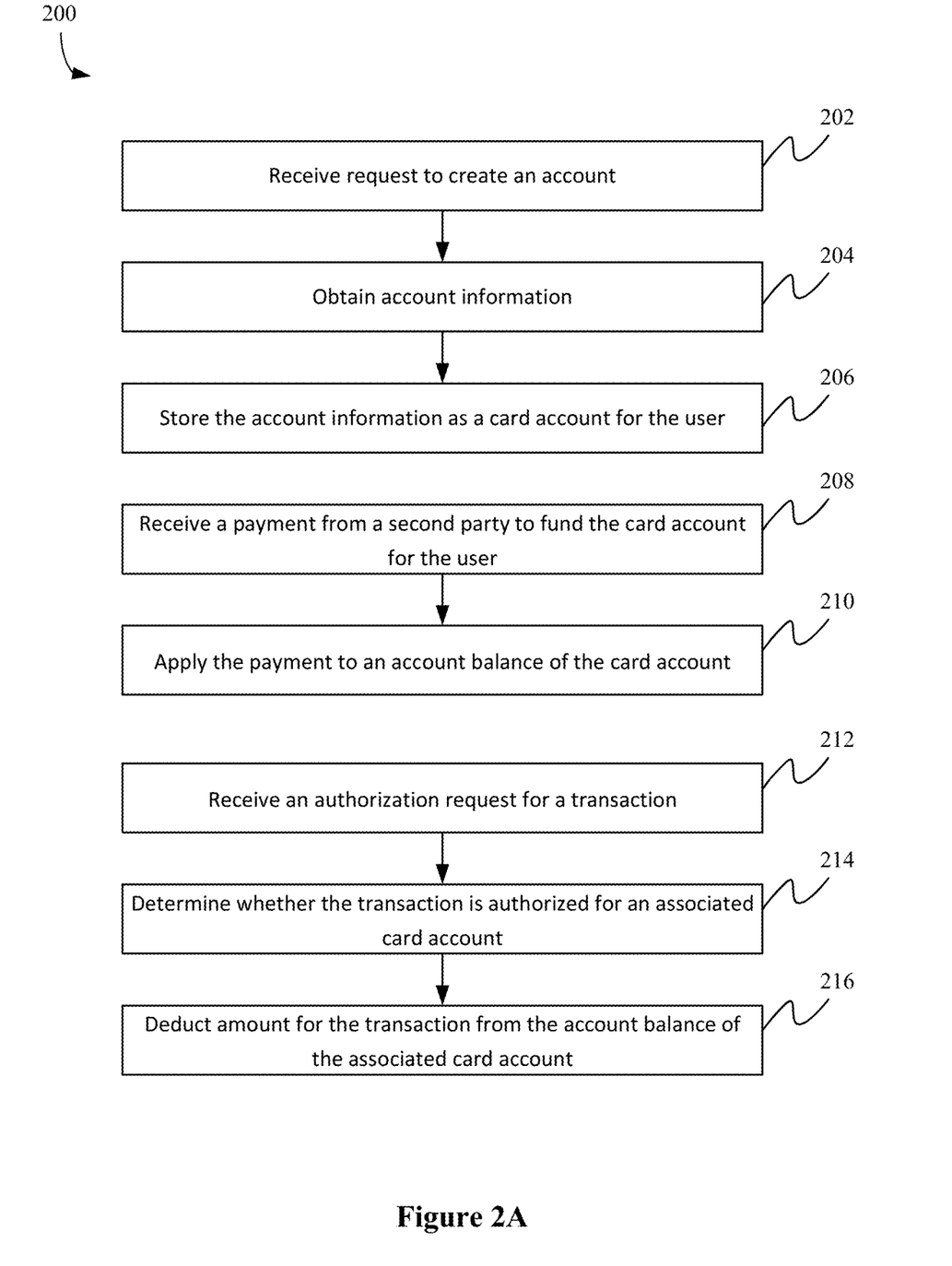
FIG. 2A illustrates example processes carried out by a peer-to-peer prepaid card management system.

FIG. 2A illustrates example processes carried out by a peer-to-peer prepaid card management system. Referring to FIG. 2A, processes 200 for peer-to-peer prepaid card accounts can include receiving (202) a request at a card management service to create an account, obtaining (204) account information, wherein the account information comprises a user name, an account number, a QR code image, and optionally biometric data; and storing (206) the account information as a card account for the user. In some cases, during the creation of the account, account restrictions can be applied (e.g., assigned to the account for later use during transactions). The account restrictions govern the types of transactions that the account can have, for example, by restricting to certain merchant category codes or restrict the types of usage such as whether the card can be used for cash withdrawals (and for how much can be withdrawn in a period of time).

In creating the account, the peer-to-peer prepaid card management system functions as an issuer system; however, the funding of the account is via another party. Here, once the card account is established/created, it is possible to fund the account by a party that is not the account creator or the account holder. For example, the peer-to-peer prepaid card management system can receive (208) a payment from a second party to fund the card account for the user; and apply (210) the payment to an account balance of the card account. The funding can be received, for example, via p2p channels or via conventional payment card network channels (e.g., via credit card processing channels). In some cases, the peer-to-peer prepaid card management system receives the funding by requesting funds transfer from a payment account identified via a payment page for funding the card account.

Once the card is created, the card holder may use the card to make purchases. The peer-to-peer prepaid card management system can perform similar processes as an issuer by receiving (212) an authorization request for a transaction; determining (214) whether the transaction is authorized for an associated card account; and deducting (216) an amount for the transaction from the account balance of the associated card account. When there are account restrictions, the determining whether the transaction is authorized can further include determining whether the transaction is a valid type of transaction, for example, from an approved merchant code, in addition to whether there are sufficient funds.

Figure 2B:
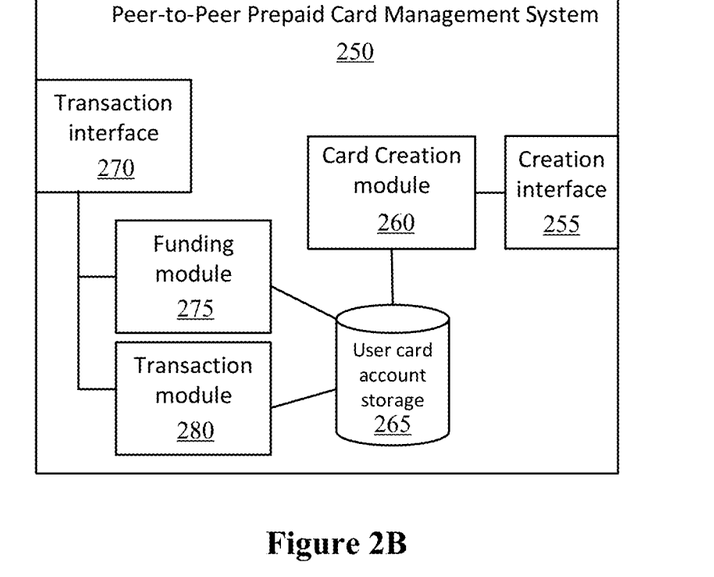
FIG. 2B illustrates a representational diagram of a peer-to-peer prepaid card management system.

FIG. 2B illustrates a representational diagram of a peer-to-peer prepaid card management system. Referring to FIG. 2B, a peer-to-peer prepaid card management system 250 can include a creation interface 255, a card creation module 260, a user card account storage resource 265, a transaction interface 270, a funding module 275, and a transaction module 280. Aspects of peer-to-peer prepaid card management system 250 may perform processes 200 described with respect to FIG. 2A. The peer-to-peer prepaid card management system 250 may be implemented by a computing system having one or more processors, one or more storage resources, and one or more communications interfaces (e.g., for communicating over a network). System 250 may be embodied by a server.

The creation interface 255 can include application programing interfaces or other entry points to the card creation module 260 that enable a peer-to-peer prepaid card to be established for a user. The creation interface 255 may be accessible via a card creation application or a browser application executing on a computing device. The card creation module 260 can create a new account for a user, for example as described with respect to method 300 of FIG. 3. The user card account storage resource 265 can store the information of the new account created by the card creation module 260, including card number, account balance, QR code, one or more account restrictions, a user name, and, in certain implementations, biometric data.

The transaction interface 270 supports the receipt and transfer of funds. In some cases, separate interfaces can be provided such that one interface handles the communications regarding receipt of funds, as used by the funding module 275, and another interface handles the communications enabling funds to transfer to a merchant, as used by the transaction module 280. The transaction interface 270 may support communications from an intermediate, which may be a card network, as is typical for payment card transactions, or a system that leverages existing payment rails, such as from an existing peer-to-peer payment system such as VENMO or ZELLE. The funding module 275 can fund/credit a particular user's account in response to a signal indicating a receipt of funds via the transaction interface. In some cases, the funding module 275 can request funds transfer from a payment account identified via a payment page for funding the card account of the particular user. An example of a transaction to fund a user can be seen in FIG. 4A.

The transaction module 280 can perform functions similar to an issuer to enable a transaction to be authorized, should the transaction satisfy any account restrictions and be verified, and funds settled to a merchant. An example process carried out by the transaction module 280 is described with respect to FIG. 6B.

Figure 3:
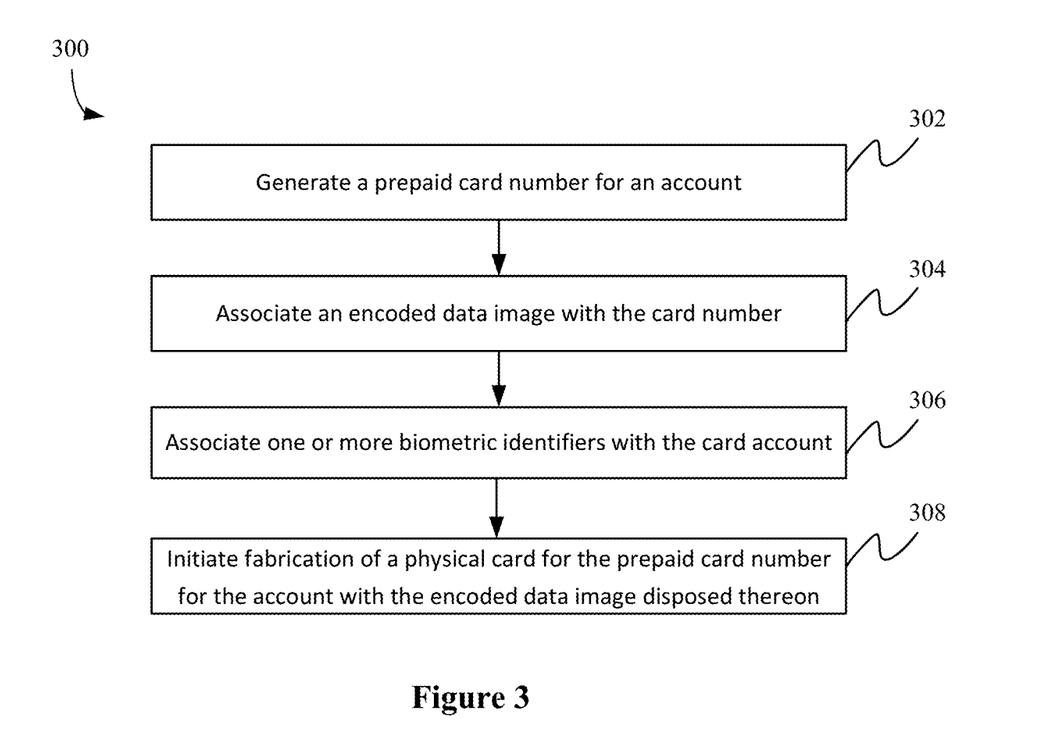
FIG. 3 illustrates a method for creating a new card account.

FIG. 3 illustrates a method for creating a new card account. The process of creating a new card account can be initiated by a number of parties, including a user (i.e., the cardholder), an individual or organization acting as a benefactor (e.g. a parent or a homelessness charity organization), or a bank or other financial institution. The process can be initiated by means of a computing device executing a card creation application or a website in a browser that communicates or provides a portal to the peer-to-peer card management system (e.g., system 250 with card creation module 260). In some cases, method 300 can be performed by a card creation module, which may be software instructions executed by a hardware processor of a peer-to-peer card management system or by a devoted hardware processor for creating new accounts.

A method 300 for creating a new card account (which links a prepaid card with an encoded data image) can begin in response to a request for a new card account and include generating a prepaid card number for an account (302). This number can be randomly generated at runtime of the method, or the method can use a previously generated number that is not attached to an existing account. The prepaid card number can be stored in the user card account storage associated with other details about the user previously entered.

The method 300 can continue with associating an encoded data image with the card number (304). The encoded data image can be, for example, a QR code. The QR code can be randomly generated at runtime of the method, or the method can use a previously generated QR code that is not attached to an existing account. The QR code can be stored in the user card account storage associated with the prepaid card number and any other details about the user.

The method 300 can continue with associating (306) one or more biometric identifiers with the card account. Biometric identifiers can include things such as fingerprints, an image of a face, or retinal scans. The biometric identifiers can be scanned in directly at runtime of the method or may be imported if already entered in a database. The one or more biometric identifiers can be stored in the user card account storage associated with the prepaid card number and any other details about the user. In some cases, this step may be omitted.

The method 300 can continue with initiating (308) the fabrication of a physical card for the prepaid card number for the account with the encoded data image disposed thereon. For example, a signal can be forwarded to a physical manufacturing device. The manufacturing device can be local to the card management system 250 or the manufacturing device can be remote. The card management system 250 may also include a physical manufacturing component. The encoded data image can be a barcode, such as a QR. The physical card can resemble existing physical cards in terms of inclusions and features (e.g. card number and name on a front side and a magnetic strip on a reverse side). In some cases, card restrictions can be applied, such as described with respect to FIGS. 5A and 5B, when creating the new card account.

Figure 4A:
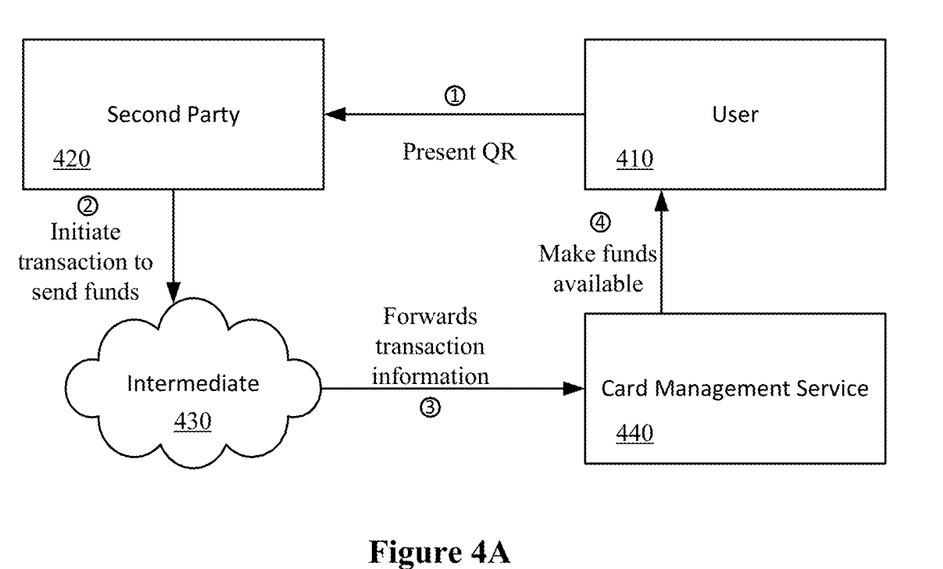
FIG. 4A illustrates a scenario for funding a user account.
Figure 4B:
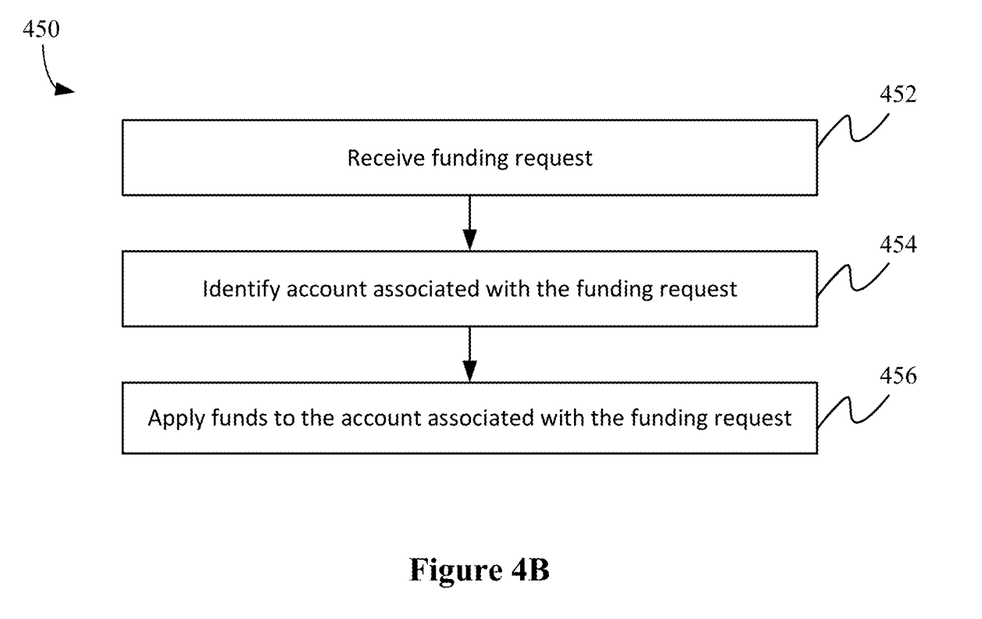
FIG. 4B illustrates an example process for funding the user account

FIG. 4A illustrates a scenario for funding a user account; and FIG. 4B illustrates an example process for funding the user account. Referring to FIGS. 4A and 4B, in the illustrated scenario, a user 410 can request funding from a second party 420. The user 410 can present a physical card with a QR code disposed thereon to a second party 420 to be scanned by a computing device of the second party 420. Scanning the QR code can cause the scanning application on the second party's computing device to decode the encoded information and, in some cases, launch a payment website in order to transfer funds or directly initiate a transfer of funds. The second party 420 can fund the user 410 from a number of sources, including an e-wallet housed on the computing device, a payment card account entered into the device, or an existing peer-to-peer payment method (e.g. PAYPAL, VENMO, ZELLE).

The funding request can be received by an intermediate 430. The intermediate 430 can depend on the mechanism of the payment from the second party 420. For example, if using a payment card account, the intermediate 430 can be the card network associated with that payment card account.

The intermediate 430 can communicate the funding request with a card management service 440 of a peer-to-peer card management system (e.g., received at a transaction interface 270 and executed by a funding module 275 of system 250 of FIG. 2B) that can perform process 450, including receiving (452) the funding request, identifying (454) the account associated with the funding request, and applying (456) funds to the account associated with the funding request. In some cases, the card management service 440 can make the funds to be received immediately available to the user 410. In other cases, the card management service 440 can make the funds available to the user only after the funding request has cleared and the funds from the funding request are actually received by the card management service 440.

Figure 5A:
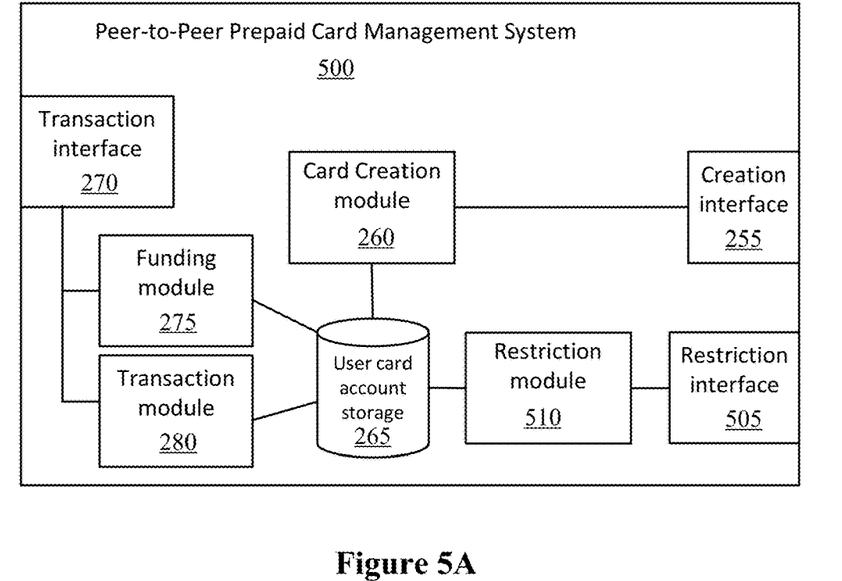
FIG. 5A illustrates a representational diagram of a peer-to-peer prepaid card management system with a card restriction feature.
Figure 5B:
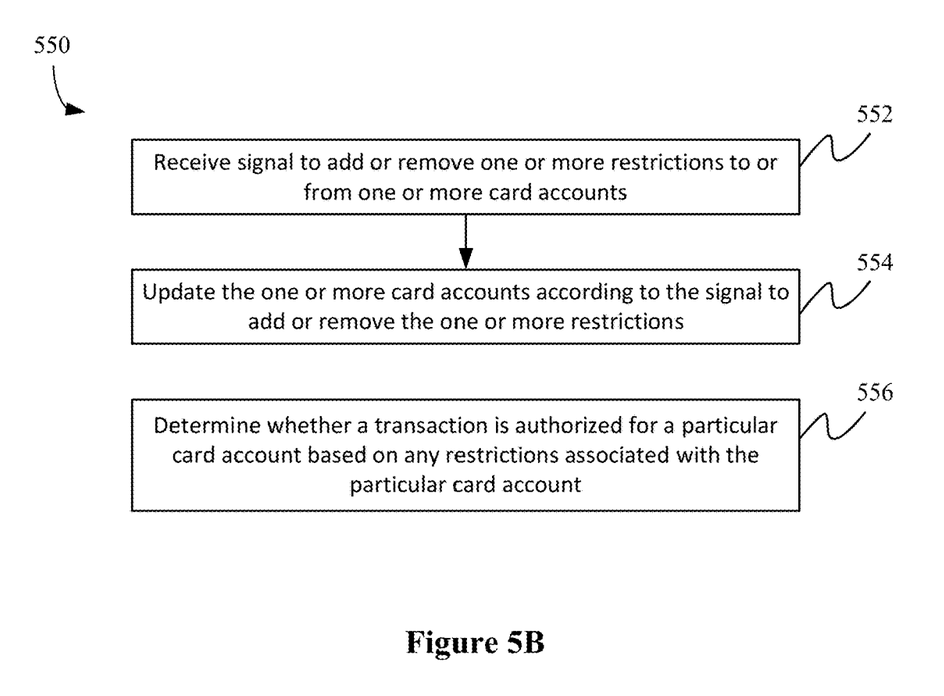
FIG. 5B illustrates an example process for managing restrictions for user accounts.

FIG. 5A illustrates a representational diagram of a peer-to-peer prepaid card management system with a card restriction feature; and FIG. 5B illustrates an example process for managing restrictions for user accounts. Referring to FIG. 5A, a peer-to-peer prepaid card management system 500 can include a card creation interface 255, card creation module 260, user card account storage resource 265, transaction interface 270, funding module 275, and a transaction module 280 such as described with respect to peer-to-peer prepaid card management system 250 of FIG. 2B. Peer-to-peer prepaid card management system 500 further includes a restriction interface 505 and restriction module 510. The restriction module 510 can be responsible for adding or removing one or more restrictions from one or more user card accounts. In some cases, aspects of both restriction interface 505 and restriction module 510 can be integrated with creation interface 255 and card creation module 260.

The restriction interface 505 communicates with a card management application or website executed in a browser so that a sponsor (e.g., sponsor 110 of FIG. 1) can initiate a method to add or remove one or more restrictions from one or more card accounts.

The restriction module 510 manages which accounts have restrictions and the particular restrictions applied and supports the transaction module 280 in order to enable transactions to be authorized.

The restriction module 510 can perform processes 550, including receiving (552) the signal from the card management application or website, via the restriction interface 505, to add or remove one or more restrictions to or from one or more card accounts; and updating (554) the one or more card accounts according to the signal to add or remove the one or more restrictions. The restriction module 510 can interpret inputs from the card management application or website, including credentials (e.g., of the supporter), card accounts to add or remove restrictions, and the restrictions themselves. For example, the restriction module 510 can support the receipt of a set of restrictions and storing of those restrictions for later application to one or more accounts. The set of restrictions may be provided by the supporter at a time of creating an account for a user, prior to any account creation, or after accounts have been created. The system 500 can associate one or more restrictions of the set of restrictions with one or more card accounts upon receipt of a command to do so. If the credentials satisfy a criteria for a particular account (e.g., that the particular account can be accessed and modified by the supporter), the inputs can be accepted, and restrictions can be associated with the particular account in the user card account storage resource 265. Examples of restrictions can include inability to withdraw cash or blocking transactions with certain merchant category codes (e.g. a parent may block transactions at an electronics store and a homelessness charity organization may block transactions at a liquor store).

Thus, when a transaction request is received via the transaction interface 270, the restriction module 510 can support the determination (556) of whether the transaction is authorized for the card account. In some cases, the restriction module 510 communicates with the transaction module 280 the restriction information associated with the card account so that the transaction module 280 can compare the transaction request against the restrictions. In some cases, the restriction module 510 receives the transaction information from the transaction module 280 and compares the transaction request against the restrictions on behalf of the transaction module 280.

Figure 6A:
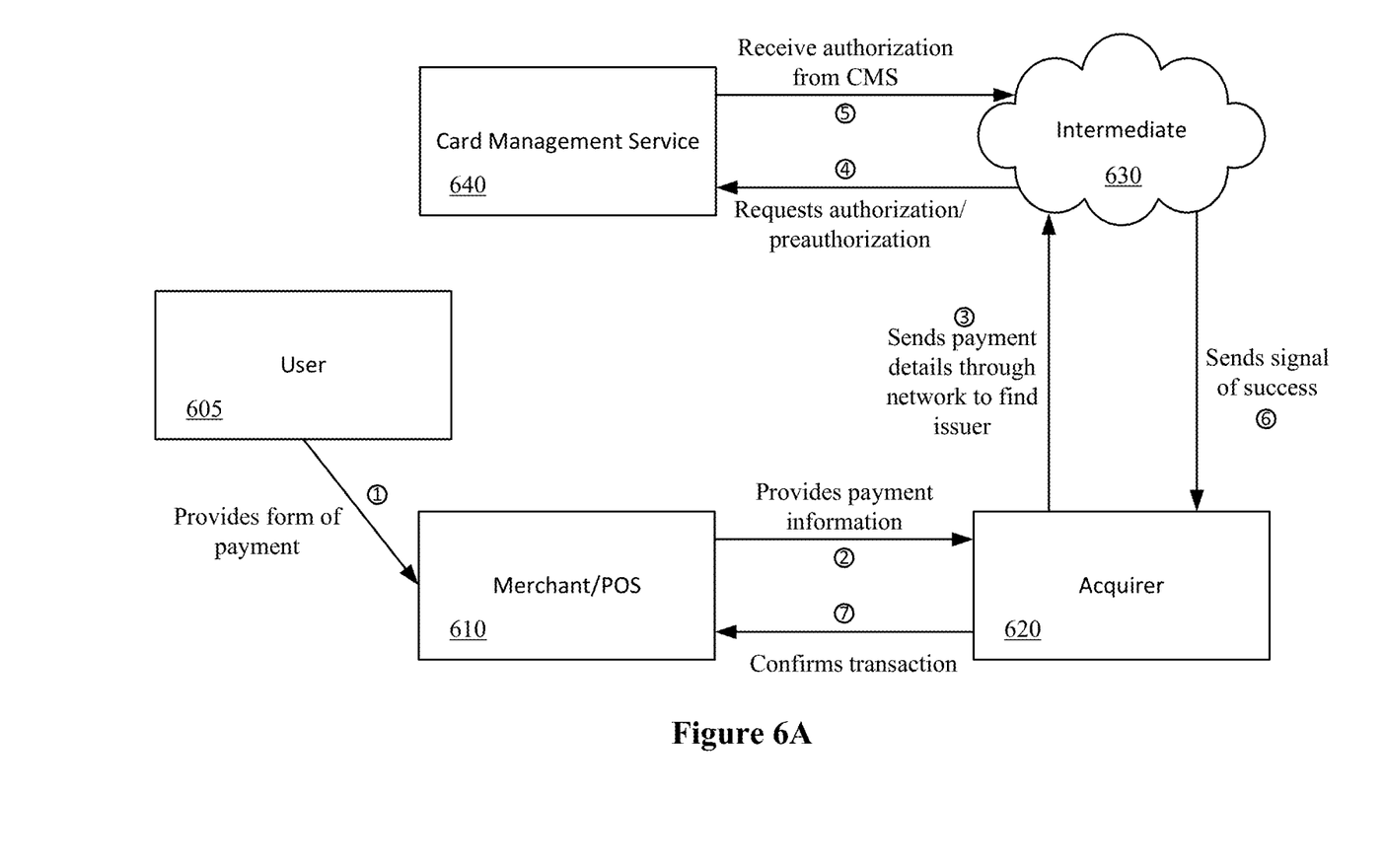
FIG. 6A illustrates a scenario for a user participating in a transaction.

FIG. 6A illustrates a scenario for a user participating in a transaction. The members of the environment can include the user 605, a merchant or point-of-sale (POS) terminal 610, an acquirer 620, an intermediate 630, and a card management service 640. The user 605 may be user 410 of FIG. 4A, who has a card account funded via card management service 440 of FIG. 4A. Card management service 640 may include the features described with respect to card management service 440 and may be embodied by peer-to-peer prepaid card management system 250 described with respect to FIG. 2B.

In the illustrated scenario, the user 605 can present a payment card associated with the card management service 640 to pay for a transaction with the merchant at the POS 610. The payment card can be processed by the POS 610 and a fresh biometric of the user 605 can be received by the merchant. A transaction request can be generated that includes card details extracted by the POS 610, fresh biometric data received from the user 605, and transaction details (e.g. items, cost, merchant category code). In some cases, such as when other security/authentication measures are used or are not needed, biometric data is not collected or used by a peer-to-peer prepaid card management system.

The transaction request can be sent to an acquirer 620 as in a conventional payment transaction. The acquirer 620 can serve as a counterparty with the card management service 640 and also communicate with the proper intermediate for the card management service 640. The acquirer 620 can forward the transaction request to the intermediate 630. The intermediate can be a party that hosts the card management service 640 or simply a party that locates them and acts as a liaison between the acquirer 620 and the card management service 640. After the intermediate 630 receives the transaction request, the transaction request can be forwarded to the card management service 640, which acts as an issuer.

Figure 6B:
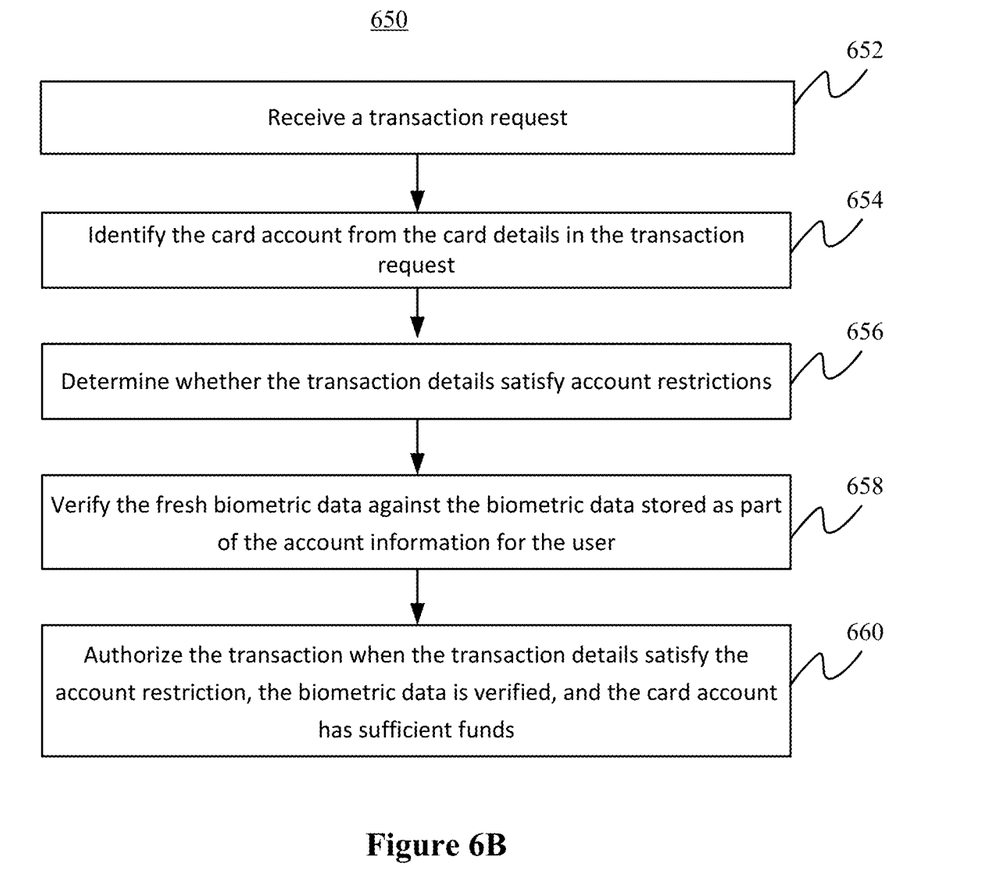
FIG. 6B illustrates a method for authorizing a transaction at the card management service.

When the transaction request is received by the card management service 640, the transaction request can be authorized (e.g., as a pre-authorization). An example process carried out by the card management service 640 is illustrated in FIG. 6B. After authorization is determined, a signal of success or failure can be passed back to eventually reach the merchant 610. The signal can pass through the intermediate 630 and acquirer 620 along the way. When the signal of success or failure is received at the merchant 610, the transaction can be completed or declined based on the signal received from the card management service 640.

FIG. 6B illustrates a method for authorizing a transaction at the card management service. Referring to FIG. 6B, the method 650 for authorizing a transaction can begin by receiving (652) a transaction request. In this example method, the transaction request includes transaction details, card details, and a fresh biometric data. As mentioned above, in some cases, such as when other security/authentication measures are used or are not needed, biometric data is not collected or used by a peer-to-peer prepaid card management system. The card management system 640 can then identify (654) the card account from the card details in the transaction request. The card management system 640 can also determine (656) whether the transaction details satisfy account restrictions. The card management system 640 can also verify (658) the fresh biometric data against the biometric data stored as part of the account information for the user.

If the transaction details satisfy the account restriction, the biometric data is verified, and the card account has sufficient funds, the card management system 640 can then authorize (660) the transaction. This signal can be sent to the intermediate 630 to end up at the POS 610.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for peer-to-peer prepaid card accounts, the method comprising:
    receiving a request at a card management service to create an account for a user;
    in response to receiving the request to create the account:
        obtaining account information, wherein the account information comprises a user name, biometric data of the user, an account number, and a QR code image to represent the account for the user;
        storing the account information as a card account for the user; and
        initiating fabrication of a physical card for the card account with the QR code image disposed thereon;
        requesting a funds transfer from a payment account of a second party identified via a payment page for funding the card account accessed by the second party using the QR code image;
        receiving a payment of the funds transfer from the second party to fund the card account for the user;
        receiving a transaction request on behalf of the user, the transaction request comprising transaction details for a transaction, card details, and a fresh biometric data of the user;
        identifying the card account from the card details in the transaction request; and
        verifying the fresh biometric data against the biometric data stored as part of the account information for the user in order to permit the transaction to proceed.

2. The method of claim 1, further comprising:
  determining whether the transaction details satisfy account restrictions;
  determining whether the card account has sufficient funds to complete the transaction; and
  authorizing the transaction when the transaction details satisfy the account restrictions, the biometric data is verified, and the card account has sufficient funds.

3. The method of claim 1, further comprising:
  obtaining one or more account restrictions for the card account for the user.

4. The method of claim 3, wherein at least one of the account restrictions is based on merchant category codes.

5. The method of claim 3, wherein at least one of the account restrictions applies to cash withdrawals.

6. The method of claim 1, further comprising obtaining biometric data with the account information;
  wherein obtaining the account information comprises:
  receiving the user name and the biometric data from a source of the request to create the account;
  generating the account number for the user; and
  generating the QR code image.

7. The method of claim 1, wherein the QR code image encodes a uniform resource location of the payment page for funding the card account.

8. The method of claim 1, further comprising obtaining biometric data with the account information;
  wherein the biometric data comprises a fingerprint or an image of a face of the user.

9. The method of claim 1, wherein receiving a payment from the second party to fund the card account for the user comprises:
  requesting funds transfer from a payment account identified via the payment page for funding the card account.

10. A peer-to-peer prepaid card management system, comprising:
  one or more processors;
  one or more storage resources;
  a user card account storage resource; and
  instructions stored on the one or more storage resources that when executed by the one or more processors direct the peer-to-peer prepaid card management system to at least:
    receive a request to create an account for a user via a creation interface of the peer-to-peer prepaid card management system;
    in response to receiving the request to create the account:
      obtain account information, wherein the account information comprises a user name, biometric data of the user, an account number, and a QR code image to represent the account for the user;
      store the account information as a card account for the user; and
      initiate fabrication of a physical card for the card account with the QR code image disposed thereon;
    request a funds transfer from a payment account of a second party identified via a payment page for funding the card account accessed by the second party using the QR code image;
    receive a payment of the funds transfer from the second party to fund the card account for the user via a transaction interface of the peer-to-peer prepaid card management system;
    receive a transaction request on behalf of the user, the transaction request comprising transaction details for a transaction, card details, and a fresh biometric data of the user;
    identify the card account from the card details in the transaction request; and
    verify the fresh biometric data against the biometric data stored as part of the account information for the user in order to permit the transaction to proceed.

11. The peer-to-peer prepaid card management system of claim 10, further comprising instructions that direct the peer-to-peer prepaid card management system to:
  determine whether the transaction details satisfy account restrictions;
  determine whether the card account has sufficient funds to complete the transaction; and
  authorize the transaction when the transaction details satisfy the account restrictions, the biometric data is verified, and the card account has sufficient funds.

12. The peer-to-peer prepaid card management system of claim 10, further comprising instructions that direct the peer-to-peer prepaid card management system to:
  obtain one or more account restrictions for the card account for the user.

13. The peer-to-peer prepaid card management system of claim 12, wherein at least one of the account restrictions is based on merchant category codes.

14. The peer-to-peer prepaid card management system of claim 12, wherein at least one of the account restrictions applies to cash withdrawals.

15. The peer-to-peer prepaid card management system of claim 10, wherein the QR code image encodes a uniform resource location of the payment page for funding the card account.

16. The peer-to-peer prepaid card management system of claim 10, wherein the instructions to receive a payment from the second party to fund the card account for the user direct the peer-to-peer prepaid card management system to:
  request funds transfer from a payment account identified via the payment page for funding the card account.

* * * * *